United States Patent Office 3,781,374
Patented Dec. 25, 1973

3,781,374
METHOD FOR THE ISOLATION OF TETRANITRO-METHANE FROM A SOLUTION OF NITRIC ACID WITH COMPARATIVELY LOW CONTENTS OF TETRANITROMETHANE
Kåre Ragnvald Fossan, Nora, Sweden, assignor to Nitro Nobel AB, Gyttorp, Sweden
No Drawing. Filed Dec. 11, 1972, Ser. No. 314,071
Claims priority, application Sweden, Aug. 3, 1972, 10,098/72
Int. Cl. C07c 79/14
U.S. Cl. 260—644       4 Claims

ABSTRACT OF THE DISCLOSURE

A method for the isolation of tetranitromethane from a solution of nitric acid with comparatively low contents of tetranitromethane is disclosed according to which method a mixture comprising tetranitromethane and nitric acid is subjected to distillation to cause an azeotropic mixture of 30% of tetranitromethane and 70% of $HNO_3$ to evaporate, whereafter the distillate consisting of the azeotropic mixture is added with water in order to break the azeotrope.

---

The present invention relates to a method for the isolation of tetranitromethane from a nitric acid solution with comparatively low contents of tetranitromethane.

It has been found that tetranitromethane and $HNO_3$ form a minimum azeotrope which has a boiling point of 81–82° C. at atmospheric pressure and an approximate composition of 30% of tetranitromethane and 70% of $HNO_3$.

In connection with the origination of the present invention, it has been found that $HNO_3$, tetranitromethane and nitrogen oxides ($N_2O_4$) form a three components system with two minimum azeotropes, one between tetranitromethane and nitric acid and one between nitrogen oxides and nitric acid.

The minimum azeotrope between $HNO_3$ and nitrogen oxides contains minor amounts of nitric acid, probably only one percent or two, and has not been investigated more in detail.

The minimum azeotrope between $HNO_3$ and tetranitromethane (TNM) is very little depending upon changes in pressure and has the composition of 30% TNM-70% $HNO_3$.

From a dilute solution of tetranitromethane in nitric acid it is thus possible by azeotropic distillation to isolate a more concentrated solution of TNM in $HNO_3$, the mixture of tetranitromethane and nitric acid distilling over while the distillation residue comprises TNM-free nitric acid.

From the distillate containing tetranitromethane and nitric acid and having a composition corresponding to the azeotrope, tetranitromethane can be isolated by the addition of water resulting in breaking of the azeotropic mixture and in precipitation of tetranitromethane as a liquid together with an aqueous solution of nitric acid.

The invention is thus characterized in that a mixture comprising tetranitromethane and nitric acid is subjected to distillation to cause an azeotropic mixture of 30% of tetranitromethane and 70% of $HNO_3$ to evaporate whereafter the distillate of the azeotropic mixture is added with water in order to break the azeotrope.

The invention is of particular importance in connection with the isolation of tetranitromethane from a reaction solution obtained by the nitration of acetylene with nitric acid, which solution in addition to tetranitromethane comprises nitrogen oxides, trinitromethane (nitroform), unreacted nitric acid and water. This nitration is in principle an oxidative nitration of acetylene with concentrated nitric acid and yields, particularly if the concentration of nitric acid is high, in the presence of nitroform a minor amount of TNM according to the reaction of equilibrium:

$$(NO_2)_3CH + HNO_3 = (NO_2)_4C + H_2O$$

Addition of water to the azeotropic mixture results in precipitation of TNM as a heavy oil which by separation may readily be removed from the aqueous solution of nitric acid formed. TNM may be used for particular purposes or be destroyed by methods known per se.

In order to isolate nitroform, the above mentioned reaction mixture is subjected to a first distillation to form a distillate comprising nitrose, tetranitomethane and concentrated nitric acid. The concentrated nitric acid is to be returned to the nitration system and the tetranitromethane will hence gradually be enriched in the reaction solution. Because of the poisonousness of this substance and of the general risks that it can bring about it would be desirable to suppress the reaction as far as possible or disencumber the recycled nitric acid of tetranitromethane in some way so that the content of this latter substance will not exceed a level of a percent or so in the reaction solution.

According to an embodiment of the invention, a mixture of nitrogen oxides, tetranitromethane and nitric acid, which mixture is obtained by distillation of a reaction solution, obtained by nitration of acetylene with concentrated nitric acid, is subjected to stripping in order to remove the nitrogen oxides and the solution which has undergone stripping is subjected to distillation with separation of the azeotropic mixture of 30% of tetranitromethane and 70% of nitric acid.

According to an embodiment of the invention, the distillation for separating off the azeotrope may be carried out at elevated or reduced pressure.

According to another embodiment of the invention, the distillate consisting of the azeotropic mixture of tetranitromethane and nitric acid is added with water in an amount sufficient to form a 60–65% solution of nitric acid ($HNO_3$) in water and tetranitromethane which is sparingly soluble in the nitric acid phase.

The invention will be further illustrated by means of the following example.

EXAMPLE 1000 kg. of a nitric acid containing solution containing 2% of tetranitromethane and 4% of nitrogen oxides were introduced into a stripper in order to remove the nitrogen oxides. In the stripper about 40 kg. of nitrogen oxides departed. The solution disencumbered of nitrogen oxides and weighing 960 kg. was introduced into the middle part of a distillation column, 66.7 kg. azeotrope consisting of 20 kg. of tetranitromethane and 46.7 kg. of $HNO_3$ being obtained as a distillate and 893.3 kg. of 99% $HNO_3$ as a residual reflux. In order to treat the obtained azeotrope further it was added with 31 kg. of water, which addition gave a 60% nitric acid with 0.5–0.8% of tetranitromethane and 20 kg. of tetranitromethane as a separate phase. Tetranitromethane may either be destroyed in a manner known per se or collected for use for particular purposes.

Tetranitromethane precipitates in the form of a heavy oil which may easily be separated from the solution of nitric acid in water.

The dilute acid still contains minor amounts of dissolved tetranitromethane. If it is found desirable to purify it further also from these minor amounts this may be done by a simple subsequent operation namely by driving off a small amount of a mixture of tetranitromethane and water from the solution of the acid at which a 60–

65% nitric acid free from tetranitromethane is obtained as the distillation residue.

What I claim is:

1. Method for the isolation of tetranitromethane from a solution of nitric acid with comparatively low contents of tetranitromethane, wherein a mixture comprising tetranitromethane and nitric acid is subjected to distillation to cause an azeotropic mixture of 30% of tetranitromethane and 70% of $HNO_3$ to evaporate, whereafter the distillate consisting of the azeotropic mixture is added with water in order to break the azeotrope.

2. Method according to claim 1, wherein a mixture of nitrogen oxides, tetranitromethane and nitric acid is subjected to stripping in order to remove the nitrogen oxides and the solution which has undergone stripping is subjected to distillation with separation of the azeotropic mixture.

3. Method according to claim 2, wherein the mixture of nitrogen oxides, tetranitromethane and nitric acid ($HNO_3$) is obtained by distilling a reaction solution obtained at the nitration of acetylene with concentrated nitric acid.

4. Method according to claim 1, wherein water is added to the distillate consisting of an azeotropic mixture of tetranitromethane and nitric acid in a sufficient amount to form a 60–65% solution of nitric acid in water and tetranitromethane which is sparingly soluble in the nitric acid phase.

References Cited
UNITED STATES PATENTS 2,658,084   11/1953   Wetterholm et al. __ 203—95 X

OTHER REFERENCES

Hackh's Chemical Dictionary, The Blakiston Co., Philadelphia, 1944, p. 579—QD5H3.

LELAND A. SEBASTIAN, Primary Examiner